(12) United States Patent
Belloche et al.

(10) Patent No.: US 9,557,145 B2
(45) Date of Patent: Jan. 31, 2017

(54) VEHICLE EQUIPPED WITH A DOOR PROTECTION DEVICE ENSURING AN OPTIMIZATION OF THE OPENING CLEARANCE

(71) Applicant: NEXTER SYSTEMS, Roanne (FR)

(72) Inventors: Jérôme Belloche, Bourges (FR); Patrick Dersoir, Bourges (FR); Christophe Vandenberg, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 0 days.

(21) Appl. No.: 14/787,441

(22) PCT Filed: Apr. 25, 2014

(86) PCT No.: PCT/FR2014/051003
§ 371 (c)(1),
(2) Date: Oct. 27, 2015

(87) PCT Pub. No.: WO2014/177795
PCT Pub. Date: Nov. 6, 2014

(65) Prior Publication Data
US 2016/0076857 A1    Mar. 17, 2016

(30) Foreign Application Priority Data

Apr. 29, 2013 (FR) .................................... 13 00994

(51) Int. Cl.
*B60D 1/00* (2006.01)
*F41H 7/04* (2006.01)
(Continued)

(52) U.S. Cl.
CPC ................. *F41H 7/04* (2013.01); *B60D 1/167* (2013.01); *E06B 5/12* (2013.01); *F41H 5/026* (2013.01); *F41H 5/226* (2013.01)

(58) Field of Classification Search
CPC ............ F41H 7/04; F41H 5/026; F41H 5/226; B60D 1/167; E06B 5/12
(Continued)

(56) References Cited

U.S. PATENT DOCUMENTS

2012/0137866 A1    6/2012    Gonard et al.
2013/0074686 A1    3/2013    Serpeault

FOREIGN PATENT DOCUMENTS

EP    1837234 A1    9/2007
EP    2463613 A1    6/2012
(Continued)

OTHER PUBLICATIONS

Jan. 7, 2014 Preliminary Search Report issued in French Patent Applicaton No. 1300994.
(Continued)

*Primary Examiner* — Joseph D Pape
(74) *Attorney, Agent, or Firm* — Oliff PLC (57) ABSTRACT

A vehicle including a door and a ballistic protection device for a door having a ballistic protection element connected to the door via a device for automatically bringing closer and spacing apart the protection element when opening and closing the door, the device for bringing closer and spacing apart include at least one upper connecting arm and at least one lower connecting arm of the same length and hinged to the protection element and the door, so that the protection element and the door can be brought closer to and spaced apart from each other, while remaining parallel to each other, and at least one actuating arm, hinged to the at least one lower connecting arm and to a fixed part of the vehicle, so as to control, by action on the at least one lower connecting arm, the displacement of the protection element with respect to the door.

19 Claims, 4 Drawing Sheets

(51) Int. Cl.
  *F41H 5/02*     (2006.01)
  *F41H 5/22*     (2006.01)
  *B60D 1/167*    (2006.01)
  *E06B 5/12*     (2006.01)
(58) Field of Classification Search
  USPC .......................................... 296/61; 89/36.08
  See application file for complete search history.

(56)              References Cited

FOREIGN PATENT DOCUMENTS

EP       2573501 A1    3/2013
FR       2958738 A1    10/2011

OTHER PUBLICATIONS

Jan. 7, 2014 Written Opinion issued in French Patent Application No. 1300994.
Jul. 28, 2014 International Search Report issued in International Patent Application No. PCT/FR2014/051003.

VEHICLE EQUIPPED WITH A DOOR PROTECTION DEVICE ENSURING AN OPTIMIZATION OF THE OPENING CLEARANCE

BACKGROUND

The technical field of the present invention is the technical field of devices for protecting vehicles, particularly armoured vehicles, from ballistic projectiles, particularly hollow-charge projectiles such as rockets (RPG).

Protecting armoured vehicles from projectiles very often consists in installing, all around the vehicle, a protection device comprising a ballistic protection element spaced apart from the vehicle structure and generally constituted by grids, nets or other openwork devices, the mesh size of which is intended to destroy or neutralize the priming of the projectile.

The operating principle of this type of protection, referred to as passive protection, requires to move the protection element away from the vehicle structure at about 300 mm, more generally between 200 and 400 mm. The integration of such a passive protection device has to be performed so as not to interfere with the basic functionalities of the vehicle, namely the doors having to remain operational.

The vehicles are generally equipped with a door, particularly a rear door, closing an opening and hinged to the vehicle so as to constitute an access ramp for the vehicle in its entirely open position.

When it is desired to protect such a door, there is a problem according to which the maximum opening angle of the door is reduced due to the presence of the protection element which will come into contact with the ground if no means for limiting the opening angle are provided, such contact with the ground being likely to damage the protection element and thus to render the protection device inoperative.

To solve this problem, the French patent application FR 2 958 738 discloses a protection device comprising connecting means and spacing means arranged between the protection element and the door, the connecting means allowing to bring them closer when opening the door, and the spacing means allowing to space them apart when closing the door. In this manner, the protection element can be positioned at a nominal distance when the door is closed, and can be brought closer to the door when opened, so as to be sufficiently spaced from the ground to prevent its deterioration, while allowing to increase the maximum opening angle of the door.

In this protection device, the protection element is carried only by the door, the coming closer together of the protection element and the door is ensured by springs, and the spacing apart of the protection element and the door is caused by the support of struts against a fixed part of the vehicle, around the opening closed by the door.

Although this protection device satisfactorily solves the aforesaid problem, it has the disadvantage of having a relatively complex structure involving a significant number of parts and a meticulous assembly, thereby causing a relative increase of the manufacturing costs.

Thus, there is a need for a protection device having a simpler and industrially-optimized structure with a lower cost, while allowing to automatically bring the protection element and the door closer during the opening of the door and space them apart during the closing thereof, respectively.

The present invention is intended to meet this need by providing a protection device with which the protection element is connected to the door by forming a deformable parallelogram(s) structure, the deformation of which is automatically controlled when opening and closing the door.

The use of at least one deformable parallelogram allows not only to solve the aforesaid problem, but also to provide a gradual and smooth movement of the protection element with respect to the door.

BRIEF SUMMARY OF THE INVENTION

The present invention thus relates to a vehicle comprising a door hinged at the bottom of an opening of the vehicle for being able to pivot around a horizontal axis and to constitute, in its entirely open position, a ramp facilitating the access to the interior of the vehicle, the vehicle comprising a ballistic protection device for a door having a ballistic protection element facing the door and connected to the door via means for automatically bringing closer and spacing apart the protection element and the door when opening and closing the door, respectively, characterized in that said means for bringing closer and spacing apart comprise:

- at least one upper connecting arm and at least one lower connecting arm hinged to the protection element and to the door at their top part and at their bottom part, respectively, the upper and lower connecting arms having the same length and being arranged such that the average plane of the door and the average plane of the protection element can be brought closer to and spaced apart from each other, while remaining parallel to each other, and
- at least one actuating arm hinged to the at least one lower connecting arm and to a fixed part of the vehicle, around said opening, so as to control, when pivoting the door, by action on the at least one lower connecting arm, the displacement of the protection element with respect to the door, each aforesaid hinge allowing a relative rotation around a horizontal axis which is parallel to the pivot axis of the door, and the lengths of the actuating and connecting arms being fixed.

The at least one lower connecting arm can be constituted by a rod, the three hinge points being in this case aligned along the longitudinal direction of the arm.

Preferably, the three hinge points of the at least one lower connecting arm are arranged at the three vertices of a triangle, the hinge point between the at least one lower connecting arm and the at least one actuating arm being located, in a closed position of the door, below the hinge point between the at least one lower connecting arm and the protection element. Thus, the at least one lower connecting arm can take the form of a triangular plate. It is also possible to use, as a lower connecting arm, a T-shaped element the vertical bar of which (stem of T) is smaller than the horizontal bar (arm of T), the hinge points to the door and to the protection element being provided at both ends of the horizontal bar while the third hinge point is provided at the free end of the vertical bar of the T-shaped element.

According to a particular embodiment, the means for bringing closer and spacing apart comprise at least one pair of upper and lower connecting arms. The upper and lower connecting arms of a same pair of connecting arms can or cannot be in a same vertical plane or in immediately adjacent vertical planes.

Advantageously, the pivot axis of the hinge connecting the at least one actuating arm and the fixed part of the vehicle is above the pivot axis of the door and on the rear side of the vehicle with respect to a vertical plane which passes through the pivot axis of the door.

The vehicle according to the present invention can comprise two lower connecting arms, each being hinged in the vicinity of an edge of the door, and to each of which an actuating arm is hinged.

According to a particular embodiment, in the closed position of the door, each connecting arm is perpendicular or substantially perpendicular to the door.

With such an arrangement, not only the strength provided by the connecting arms in case of impact is maximum, but also, for a given nominal distance between the protection element and the door in the closed position, the distance between the protection element and the door in the entirely open position can be minimum, particularly because the pivoting of the door from its closed position to its entirely open position causes the protection element, via the at least one actuating arm, to move closer to the door throughout the pivoting of the door, and to move away from the door throughout the pivoting of the latter from its entirely open position to its closed position.

The vehicle according to the present invention can comprise at least one yoke to which the at least one actuating arm is hinged, preferably removably hinged.

The at least one yoke can be specific to the hinge of an actuating arm or used to attach towing means for towing the vehicle.

Indeed, it can be noted that to removably hinge the at least one actuating arm to the at least one yoke allows, after separating the actuating arms from the vehicle, to raise the protection element with respect to the door and thus release the at least one yoke for attaching towing means of the vehicle while largely clearing the access to the at least one yoke, in particular to make the upper and lower pulling angles maximum on the at least one yoke.

Advantageously, means are provided for holding the protection element in a position, called raised position, in which the at least one actuating arm is separated from the at least one towing yoke and the protection element has been moved upwards by pivoting the at least one upper connecting arm so as to clear an access to said at least one towing yoke to allow the vehicle to be towed.

Such means can be, for example, one or more clip pins, each being associated with a yoke integral with the fixed rear part of the vehicle and receiving a connecting arm to ensure its immobilization in the raised position.

According to optional particular features, the door is formed by a panel having a first part hinged to the vehicle and a second part hinged to the first part and constituting a hatch which can open while the door is closed, and wherein the protection element has a first part connected to said first part of the door by the means for automatically bringing closer and spacing apart, and a second part facing the hatch and hinged to the first part of the protection element so as to allow the second part to pivot with respect to the first part around a pivot axis parallel to the pivot axis of the second part of the door. The pivoting of the hatch is thus not blocked by the protection element, and the protection device does not block the hatch.

The present invention also relates to a ballistic protection device for a door of a vehicle, the device comprising a ballistic protection element to be positioned facing a door of the vehicle having a horizontal pivot axis, and means for allowing the protection element and the door to be automatically brought closer and spaced apart when opening and closing the door, respectively, the means for bringing closer and spacing apart being also intended to connect the ballistic protection element and the vehicle and the door, the device being characterized in that said means for bringing closer and spacing apart comprise:

at least one upper connecting arm and at least one lower connecting arm hinged to the protection element and intended to be hinged to the door at their top part and their bottom part, respectively, the upper and lower connecting arms having the same length and being arranged such that, once mounted, the average plane of the protection element can be brought closer to and spaced apart from the average plane of the door, while remaining parallel thereto, and at least one actuating arm hinged to the at least one lower connecting arm and intended to be hinged to a fixed part of the vehicle, around said opening, so as to control, when pivoting the door, by action on the at least one lower connecting arm, the displacement of the protection element with respect to the door, each aforesaid hinge allowing, once mounted, a relative rotation around a horizontal axis which is parallel to the pivot axis of the door, and the lengths of the actuating and connecting arms being fixed.

To better illustrate the subject-matter of the present invention, a particular embodiment will be described below in reference to the appended drawings.

DETAILED DESCRIPTION

Figure 1:
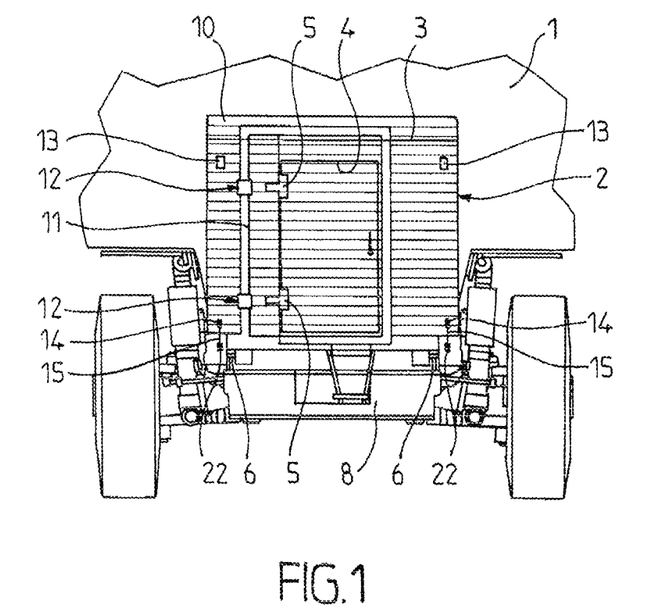
FIG. 1 is a rear view of an armoured vehicle equipped with a protection device according to a particular embodiment of the present invention.

When referring to FIG. 1, the rear part of a vehicle 1 is shown, in which an opening to access the vehicle 1 is formed, being closed by a door 2 under the form of a panel having a first part 3 defined by the peripheral region of the door 2 and a second part 4 constituting a hatch at the center of the door 2 and hinged in 5 to said first part 3 so as to be able to open or close while the first part 3 remains stationary. The first part 3 is hinged to the vehicle in 6, below said access opening and along a horizontal pivot axis, such that the door 2 can pivot between a closed position, in which it closes the access opening, and an open position, in which it is entirely open and constitutes a ramp to access the vehicle, with the hatch 4 held in its closed position.

The door 2 described above and its assembly on such a vehicle 1 are well known.

A rear shield 8 is arranged below the door 2 and has a tilted lower surface which is oriented downwards and towards the outside of the vehicle 1.

The protection of the door 2 is ensured by a protection device comprising a ballistic protection element 9 which, in the particular embodiment shown, is a grid made of parallel metal bars integral with a frame.

The protection element 9 is particularly provided with a first peripheral part 10 and a second part 11 facing the hatch 4 and hinged in 12 to the first part 10 along a pivot axis parallel to that of the hatch 4, such that said second part 11 can pivot with respect to said first part 10 when opening and closing the hatch 4 while the first part 3 of the door 2 remains in the closed position, thereby preventing the hatch 4 from being blocked.

Figure 2:
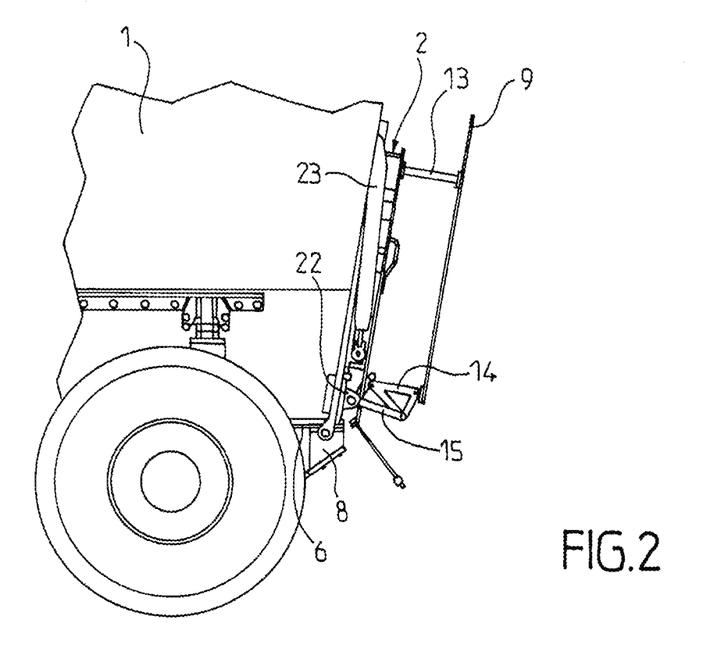
FIG. 2 is an outer side view of the rear part of the vehicle of FIG. 1, the door being in a closed position and the protection element being spaced apart from the door by the nominal distance.

When also referring to FIG. 2, it can be seen that the protection device is also provided with two upper connecting arms 13, two lower connecting arms 14 and one or two actuating arms 15.

Figure 4:
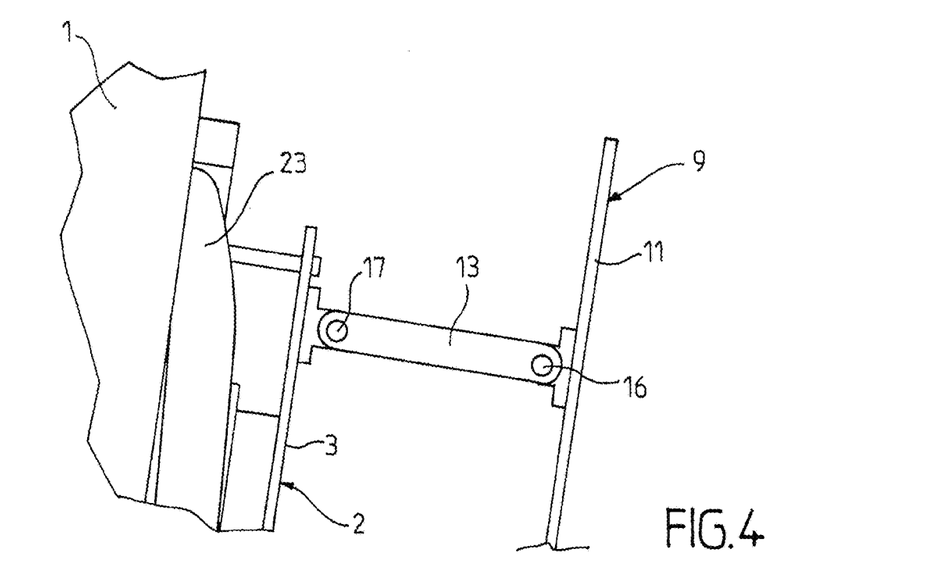

When also referring to FIG. 4, it can be seen that the upper connecting arms 13 are bars connected, at one end, to the protection element 9, on the upper part thereof and its side oriented towards the door 2, by a pivot link 16 and, at the opposite end, to the door 2, on the upper part thereof, and particularly to the first part 3 of the door 2, by a pivot link 17.

Figure 3:
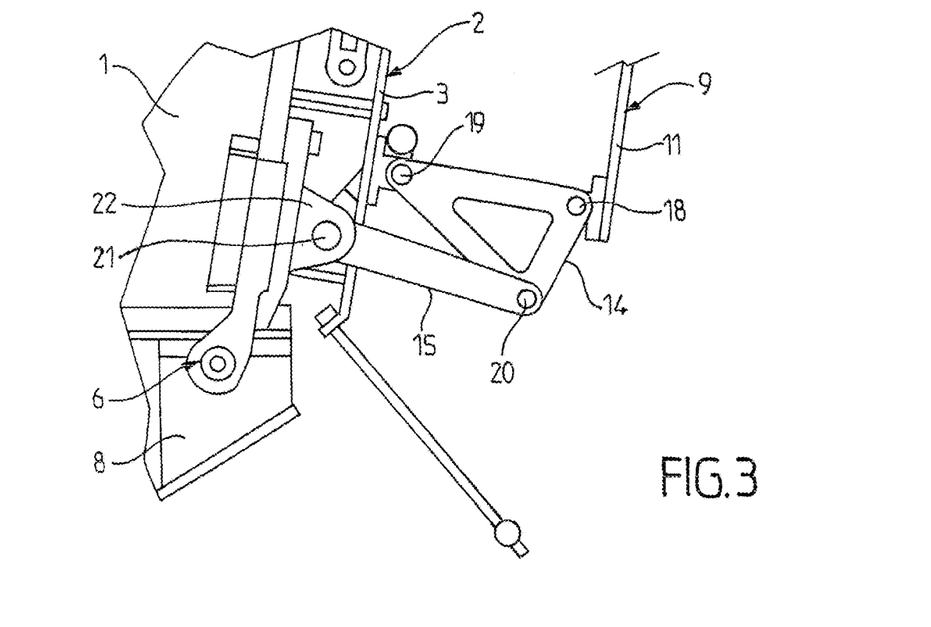
FIGS. 3 and 4 are detailed views of FIG. 2, respectively showing the upper and lower regions of the protection device.

When now referring to FIGS. 1, 2 and 3, it can be seen that the lower connecting arms 14 are triangular plates connected, at a first vertex, to the protection element 9, on the lower part thereof and its side oriented towards the door 2, by a pivot link 18 and, at a second vertex, to the first part 3 of the door 2, on the lower part thereof, by a pivot link 19.

As it can better be seen in FIG. 1, both upper connecting arms 13 and both lower connecting arms 14 are each arranged in one of both upper and lower angle regions, respectively, of the door 2.

When still referring to FIGS. 1, 2 and 3, it can be seen that each actuating arm 15 is a bar connected, at one end, to the third vertex of a lower connecting arm 14 by a pivot link 20 and, at the opposite end, to a towing yoke 22 of the vehicle 1 by a pivot link 21, which towing yoke 22 is carried by the wall of the vehicle 1 surrounding the opening closed by the door 2, and thus is stationary.

All pivot links 16, 17, 18, 19, 20 and 21 have an axis horizontal and transverse to the longitudinal direction of the vehicle 1, and are at any time parallel to the pivot axis of the door 2 with respect to the vehicle 1.

The straight line passing through the pivot links 16 and of the upper connecting arms 13 is parallel to the straight line passing through the pivot links 18 and 19 of the lower connecting arms 14.

The pivot links 21 of each actuating arm 15 are removable meaning they allow each actuating arm 15 to be separated from the door 2 and, possibly, from the protection element 9.

The lower connecting arms 14 and the upper connecting arms 15 have substantially the same length and are arranged such that the average planes of the door 2 and the protection element 9 are parallel.

Therefore, each upper connecting arm 15 forms, with a corresponding lower connecting arm 14, a pair of connecting arms, and each pair of connecting arms forms, together with the protection element 9 and the door 2, a deformable parallelogram structure, the deformation of which is controlled by an actuating arm 15. Thus, in the embodiment shown, a structure with two deformable parallelograms is formed.

The manner according to which the protection element 9 is automatically brought closer to and spaced apart from the door 2, when opening and closing the door 2, respectively, while remaining parallel to the latter, will be now described in reference to FIGS. 2, 5, 6 and 7.

When first referring to FIG. 2, it can be seen, when the door 2 is in the closed position, that the protection element 9 is parallel to the door 2 and spaced apart from the latter by the nominal distance (maximum distance), for example 300 mm.

In the embodiment shown, the actuating arms 15 and the upper 13 and lower 14 connecting arms are arranged such that, in the closed position of the door 2, the upper connecting arms 13 and the side connecting the first and second vertices of each of the lower connecting arms 14 are perpendicular to the average plane of the door 2 and the average plane of the protection element 9.

Figure 5:
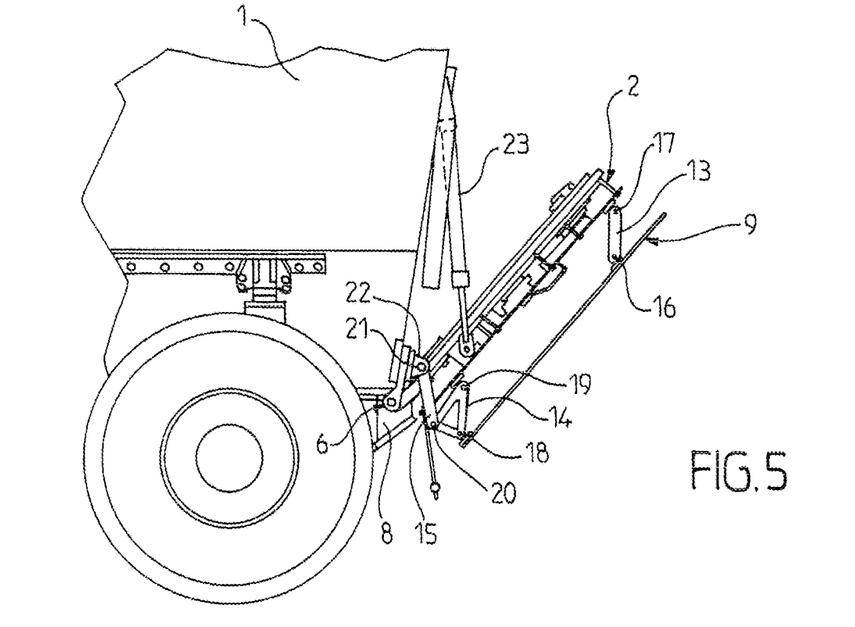
FIGS. 5 and 6 are side views representing the door in respectively half-opened and entirely open positions, the distance between the protection element and the door being respectively reduced and minimum.

When referring to FIG. 5, it can be seen that, once the door 2 has pivoted around its hinge 6 under the action of two cylinders 23, as they have a fixed length, the actuating arms 15 are caused to simultaneously pivot downwards around the axis of their pivot link 21 and rotate the lower connecting arms 14 downwards around their pivot link 19 by pulling at their third vertex, which causes the upper connecting arms 13 to simultaneously rotate downwards, such that the protection element 9 is brought closer to the door 2 while offsetting downwards with respect thereto.

Figure 6:
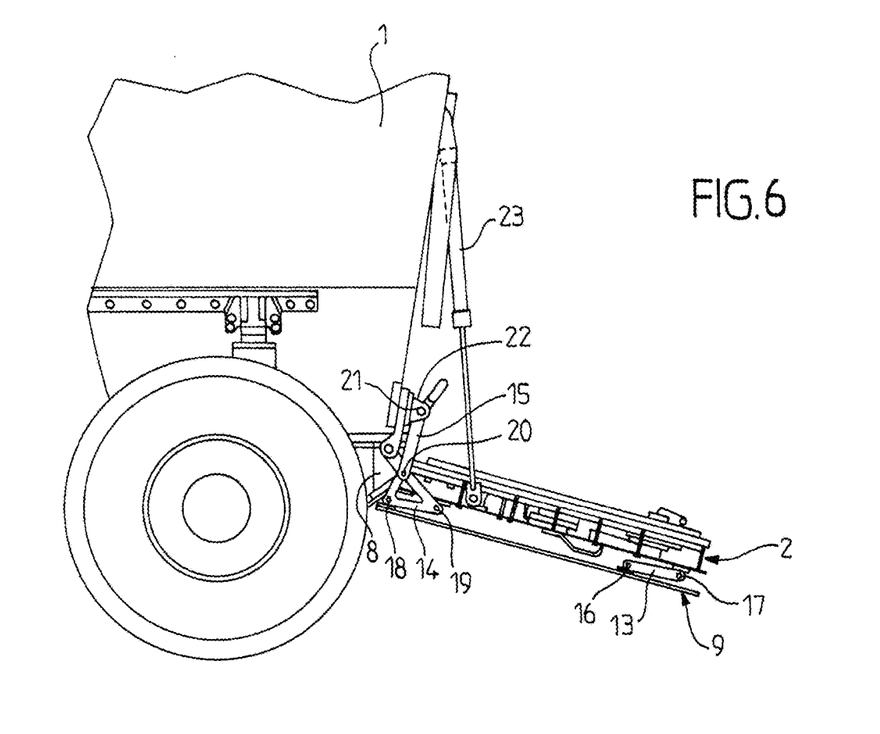
Figure 7:
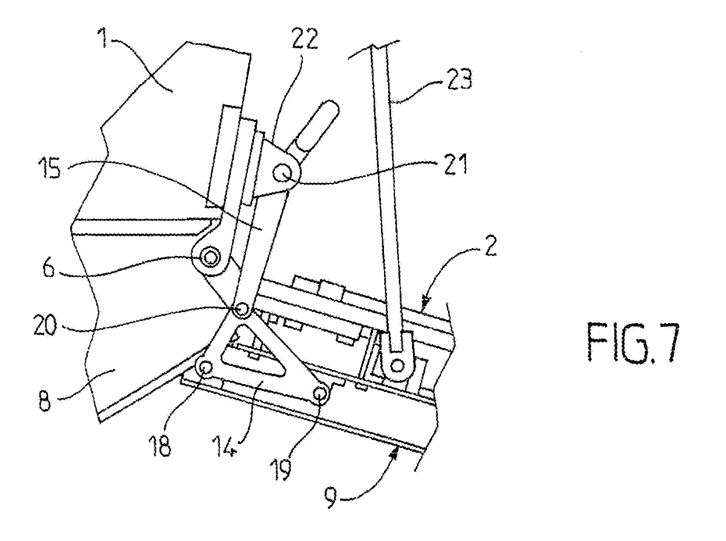
FIG. 7 is a detailed view of FIG. 6, showing the lower part of the protection device.

This bringing closer of the protection element 9 continues during the entire opening movement of the door 2 to its entirely open position, shown in FIGS. 6 and 7, in which the protection element 9 is at a minimum distance from the door 2.

It can be highlighted that, because the pivot links 21 are arranged above the pivot axis of the door 2 and on the rear side of the vehicle 1 with respect to a vertical plane which passes through the pivot axis of the door 2 and is transverse to the average longitudinal line of the vehicle 1, the actuating arms 15, at the end of the rotation of the door 2 to its entirely open position, will exert an upwards traction, but not a downwards traction on the lower connecting arms 14, which causes the protection element 9 to be raised and spaced apart from the ground to prevent its deterioration, and to be brought closer to the door 2, allowing a maximum opening angle.

When particularly referring to FIG. 7, it can be seen that the kinematics of the protection device, particularly the lengths and positions of the different arms 14 and 15, allows to prevent the protection element 9 from interfering with the rear shield 8.

The reverse movement of the protection element 9 with respect to the door 2 is performed when the door 2 pivots from its entirely open position to its closed position, the protection element 9 spacing apart by the nominal distance, as shown in FIG. 1.

It can be noted that, in the particular embodiment, the nominal distance is equal to the length of the upper 13 and lower connecting arms 14.

Figure 8:
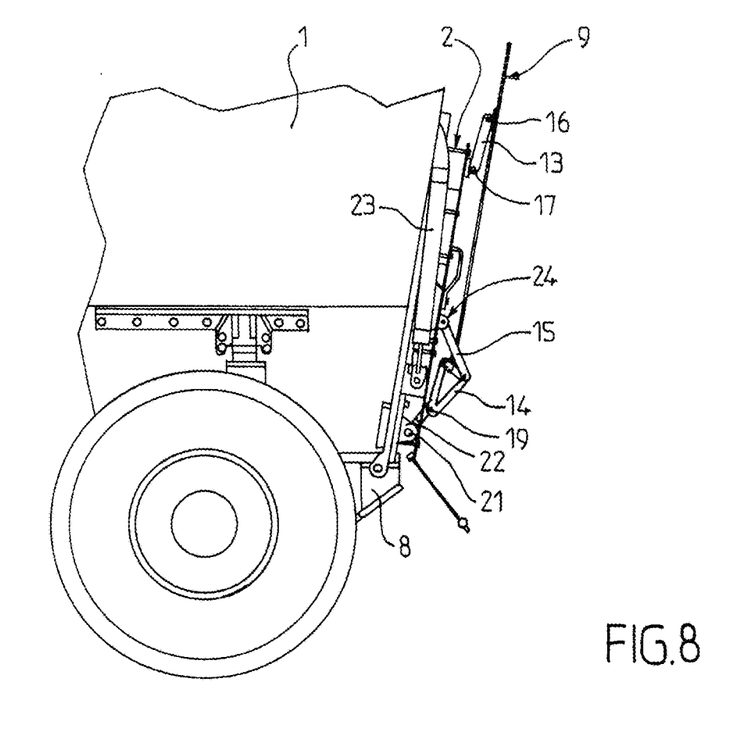
FIG. 8 is a side view of the rear part of the armoured vehicle, the door being closed and the protection element being in its raised position to allow the vehicle to be towed.

As mentioned above, the actuating arms 15 can be separated from the towing yoke 22, thereby allowing to release the towing yoke 22 to attach towing means of the vehicle, and to install the protection element 9 by upwardly rotating the upper connecting arms 13, thereby allowing to clear a large access to the towing yoke 22, as shown in FIG. 8.

The protection element will thus be attached to a yoke integral with the fixed rear part of the vehicle or the door (yoke not shown). The attachment will be ensured, for example, by temporary connecting means, such as a clip pin.

In FIG. 8, the actuating arm 15 is thus attached to a yoke 24 attached to the rear wall of the vehicle above the hinge 19. This temporary attachment allows to maintain the protection element in a raised position.

It is obvious that the particular embodiment described, as well as its variant, were given for illustrative and non-limiting purposes, and that changes can be made without departing from the scope of the present invention.

The invention claimed is:

1. A vehicle comprising
   a door hinged at the bottom part of an opening of the vehicle to pivot around a horizontal axis and constitute, in the entirely open position of the door, a ramp facilitating an access to the interior of the vehicle, the vehicle being equipped with a ballistic protection device for the door having a ballistic protection element facing the door and connected to the door via means for automatically bringing closer and spacing apart the protection element and the door when opening and closing the door, respectively, wherein the means for bringing closer and spacing apart comprise:
      at least one upper connecting arm and at least one lower connecting arm hinged via hinges to the protection element and the door respectively at the top part and the bottom part of the protection element and the door, the upper and lower connecting arms having the same length and being arranged such that the average plane of the door and the average plane of the protection element can be brought closer to and spaced apart from each other, while remaining parallel to each other, and
      at least one actuating arm hinged via at least one hinge to the at least one lower connecting arm and to a fixed part of the vehicle, around the opening, so as to control, when pivoting the door, by action on the at least one lower connecting arm, the displacement of the protection element with respect to the door,
      each hinge allowing a relative rotation around a horizontal axis which is parallel to the pivot axis of the door, and the lengths of the actuating arm and connecting arms being fixed.

2. The vehicle according to claim 1, wherein three hinge points of the at least one lower connecting arm are arranged at the three vertices of a triangle, a first hinge point between the at least one lower connecting arm and the at least one actuating arm being located, in a closed position of the door, below a second hinge point between the at least one lower connecting arm and the protection element.

3. The vehicle according to claim 1, wherein the pivot axis of the hinge connecting the at least one actuating arm and the fixed part of the vehicle is above the pivot axis of the door and on the rear side of the vehicle with respect to a vertical plane which passes by the pivot axis of the door.

4. The vehicle according to claim 1, wherein the vehicle comprises two lower connecting arms, each lower connecting arm being hinged in the vicinity of an edge of the door, and one of the at least one actuating arm being hinged to each lower connecting arm.

5. The vehicle according to claim 1, wherein, in the closed position of the door, each connecting arm is perpendicular to the door.

6. The vehicle according to claim 1, wherein the vehicle comprises at least one yoke to which the at least one actuating arm is hinged.

7. The vehicle according to claim 6, wherein there are means for holding the protection element in a position, called raised position, in which the at least one actuating arm is separated from the at least one yoke and the protection element has been moved upwards by pivoting the at least one upper connecting arm so as to clear an access to the at least one yoke to allow the vehicle to be towed.

8. The vehicle according to claim 1, wherein the door is formed by a panel having a first part hinged to the vehicle and a second part hinged to the first part and constituting a hatch which can open while the door is closed, and wherein the protection element has a first part connected to the first part of the door by the means for automatically bringing closer and spacing apart, and a second part facing the hatch and hinged to the first part of the protection element so as to allow the second part to pivot with respect to the first part around a pivot axis parallel to the pivot axis of the second part of the door.

9. A ballistic protection device for a door of a vehicle, the device comprising
   a ballistic protection element adapted to be positioned facing the door of the vehicle having a horizontal pivot axis, and means for allowing the protection element and the door to be automatically brought closer and spaced apart when opening and closing the door, respectively, the means for bringing closer and spacing apart also connecting the ballistic protection element and the vehicle and the door, wherein said means for bringing closer and spacing apart comprise:
      at least one upper connecting arm and at least one lower connecting arm hinged via hinges to the protection element and to be hinged via hinges to the door, respectively at the top part and the bottom part of the protection element and of the door, the upper and lower connecting arms having the same length and being arranged such that, once mounted, the average plane of the protection element can be brought closer to and spaced apart from the average plane of the door, while remaining parallel to the average plane of the door, and
      at least one actuating arm hinged via at least one hinge to the at least one lower connecting arm and to be hinged via another hinge to a fixed part of the vehicle, around the opening, so as to control, when pivoting the door, by action on the at least one lower connecting arm, the displacement of the protection element with respect to the door,
      each hinge allowing, once mounted, a relative rotation around an axis horizontal and parallel to the pivot axis of the door, and the lengths of the actuating and connecting arms being fixed.

10. The vehicle according to claim 1, wherein, in the closed position of the door, each connecting arm is substantially perpendicular to the door.

11. The vehicle according to claim 6, wherein the yoke is removably hinged to the at least one actuating arm.

12. A vehicle comprising:
   a door hinged at the bottom part of an opening of the vehicle, the door being configured to pivot around a horizontal axis to form a ramp that allows access to the interior of the vehicle when the door is in an open position; and
   a ballistic protection device for the door and including a ballistic protection element facing the door, the ballistic protection device being configured to automatically decrease and increase a distance between the ballistic protection element and the door in response to an operation of opening and closing the door, the ballistic protection device including:

at least one upper connecting arm and at least one lower connecting arm respectively connected to the ballistic protection element and the door at a top part and a bottom part of the ballistic protection element and the door, the at least one upper and lower connecting arms having the same length and being configured such that an average plane of the door and an average plane of the ballistic protection element is brought closer to and spaced apart from each other, while remaining parallel to each other, and at least one actuating arm connected to the at least one lower connecting arm and to a fixed part of the vehicle disposed around the opening of the vehicle so as to control, when pivoting the door, by action on the at least one lower connecting arm, a displacement of the ballistic protection element with respect to the door, wherein the door includes a relative rotation around a horizontal axis that is parallel to the pivot axis of the door, and lengths of the actuating arm and connecting arms are fixed.

13. The vehicle according to claim 12, wherein three hinge points of the at least one lower connecting arm are arranged at the three vertices of a triangle, a first hinge point between the at least one lower connecting arm and the at least one actuating arm being located, in a closed position of the door, below a second hinge point between the at least one lower connecting arm and the protection element.

14. The vehicle according to claim 12, wherein the pivot axis of the hinge connecting the at least one actuating arm and the fixed part of the vehicle is above the pivot axis of the door and on the rear side of the vehicle with respect to a vertical plane which passes by the pivot axis of the door.

15. The vehicle according to claim 12, wherein the vehicle comprises two lower connecting arms, each lower connecting arm being hinged in the vicinity of an edge of the door, and one of the at least one actuating arm being hinged to each lower connecting arm.

16. The vehicle according to claim 12, wherein, in the closed position of the door, each connecting arm is perpendicular to the door.

17. The vehicle according to claim 12, wherein the vehicle comprises at least one yoke to which the at least one actuating arm is hinged.

18. The vehicle according to claim 17, wherein there are means for holding the protection element in a position, called raised position, in which the at least one actuating arm is separated from the at least one yoke and the protection element has been moved upwards by pivoting the at least one upper connecting arm so as to clear an access to the at least one yoke to allow the vehicle to be towed.

19. The vehicle according to claim 12, wherein the door is formed by a panel having a first part hinged to the vehicle and a second part hinged to the first part and constituting a hatch which can open while the door is closed, and wherein the protection element has a first part connected to the first part of the door by the means for automatically bringing closer and spacing apart, and a second part facing the hatch and hinged to the first part of the protection element so as to allow the second part to pivot with respect to the first part around a pivot axis parallel to the pivot axis of the second part of the door.

* * * * *